(12) United States Patent
Park (10) Patent No.: US 7,422,683 B2
(45) Date of Patent: Sep. 9, 2008

(54) VORTEX SEPARATOR FOR SEPARATING FLOATING AND SETTLING SUBSTANCES FROM CENTRALLY INFLOWING STORM-WATER

(76) Inventor: No Yeon Park, 226-502, Jugong Apt., Dunchon-dong Gangdong-gu, Seoul (KR) 134-772

( * ) Notice: Subject to any disclaimer, the term of this patent is extended or adjusted under 35 U.S.C. 154(b) by 95 days.

(21) Appl. No.: 11/459,549

(22) Filed: Jul. 24, 2006

(65) Prior Publication Data

US 2007/0023355 A1    Feb. 1, 2007

(30) Foreign Application Priority Data

Jul. 27, 2005    (KR) ...................... 10-2005-0068523

(51) Int. Cl.
*E03F 5/14* (2006.01)
(52) U.S. Cl. .............................. 210/170.03; 210/512.1; 210/519; 210/532.1; 210/538; 210/539
(58) Field of Classification Search ............ 210/170.03, 210/512.1, 519, 521, 538, 540, 532.1, 539
See application file for complete search history.

(56) References Cited

U.S. PATENT DOCUMENTS

| | | | | |
|---|---|---|---|---|
| 3,965,013 | A * | 6/1976 | Jackson ....................... | 210/519 |
| 4,983,294 | A * | 1/1991 | Lamb ......................... | 210/521 |
| 4,983,295 | A * | 1/1991 | Lamb et al. .................. | 210/521 |
| 5,759,415 | A * | 6/1998 | Adams ...................... | 210/532.1 |
| 6,547,962 | B2 * | 4/2003 | Kistner et al. ........... | 210/170.03 |
| 6,730,222 | B1 * | 5/2004 | Andoh et al. ........... | 210/512.01 |
| 6,780,310 | B1 * | 8/2004 | Howe ..................... | 210/170.03 |
| 6,919,033 | B2 * | 7/2005 | Stark et al. ............... | 210/512.1 |
| 6,951,619 | B2 * | 10/2005 | Bryant ....................... | 210/519 |
| 7,182,874 | B2 * | 2/2007 | Allard et al. ................ | 210/538 |
| 7,238,281 | B2 * | 7/2007 | Su et al. ................ | 210/170.03 |

* cited by examiner

*Primary Examiner*—Christopher Upton
(74) *Attorney, Agent, or Firm*—Sherr & Vaughn, PLLC (57) ABSTRACT

Disclosed herein is a vortex separator for separating floating and settling substances from storm-water. The vortex separator of the present invention can separate fine settling substances as well as coarse settling substances, floating substances and oil from storm-water. To achieve the above purpose, the vortex separator of the present invention includes a separation casing, a guide plate, which is provided in the separation casing and supported by a connection plate, and an inlet pipe, which is coupled to the guide plate and extends outside the separation casing, so that the storm-water is drawn into the guide plate through the inlet pipe. The vortex separator further includes a perforated inclined skirt, which is provided below the guide plate to guide the settling substances onto a bottom of a sediment storage chamber and prevent the settling substances from being resuspended, and an outlet pipe, which is coupled to the separation casing at a position below the connection plate and extending outside the separation casing, so that the storm-water is discharged through the outlet pipe.

7 Claims, 9 Drawing Sheets

VORTEX SEPARATOR FOR SEPARATING FLOATING AND SETTLING SUBSTANCES FROM CENTRALLY INFLOWING STORM-WATER

CROSS-REFERENCED APPLICATIONS

The present application claims priority under 35 U.S.C. 119 and 35 U.S.C. 365 to Korean Patent Application No. 10-2005-0068523 (filed on Jul. 27, 2005), which is hereby incorporated by reference in its entirety.

BACKGROUND OF THE INVENTION

1. Field of the Invention

The present invention relates generally to vortex separators for separating floating and settling substances from centrally inflowing storm-water, in which a cylindrical guide plate is installed in a separation casing so that the space in the separation casing is partitioned into three sections, including a center space defined in the guide plate, a ring-shaped space defined between the guide plate and the inner surface of the separation casing, and a sediment storage chamber, the center space and the ring-shaped space communicating with each other at a position below the guide plate, so that storm-water spirally moves downwards in the center space and spirally moves upwards in the ring-shaped space, and, during this process, floating and settling substances and oil become separated from the storm-water and, more particularly, to a vortex separator for separating floating and settling substances from centrally inflowing storm-water, in which storm-water, which is drawn into the center space in the guide plate of the separation casing, forms a vortex in the guide plate, and, thereafter, the storm-water is moved into a ring-shaped space both by the centrifugal force of a vortex and by the inclination of a perforated inclined skirt, and, during this process, coarse and fine settling substances are moved into a sediment storage chamber through a passing hole and a guide hole of the perforated inclined skirt, thus separating settling substances, such as grit, and floating substances, such as oil and grease, from storm-water.

2. Description of the Related Art

Figure 1:
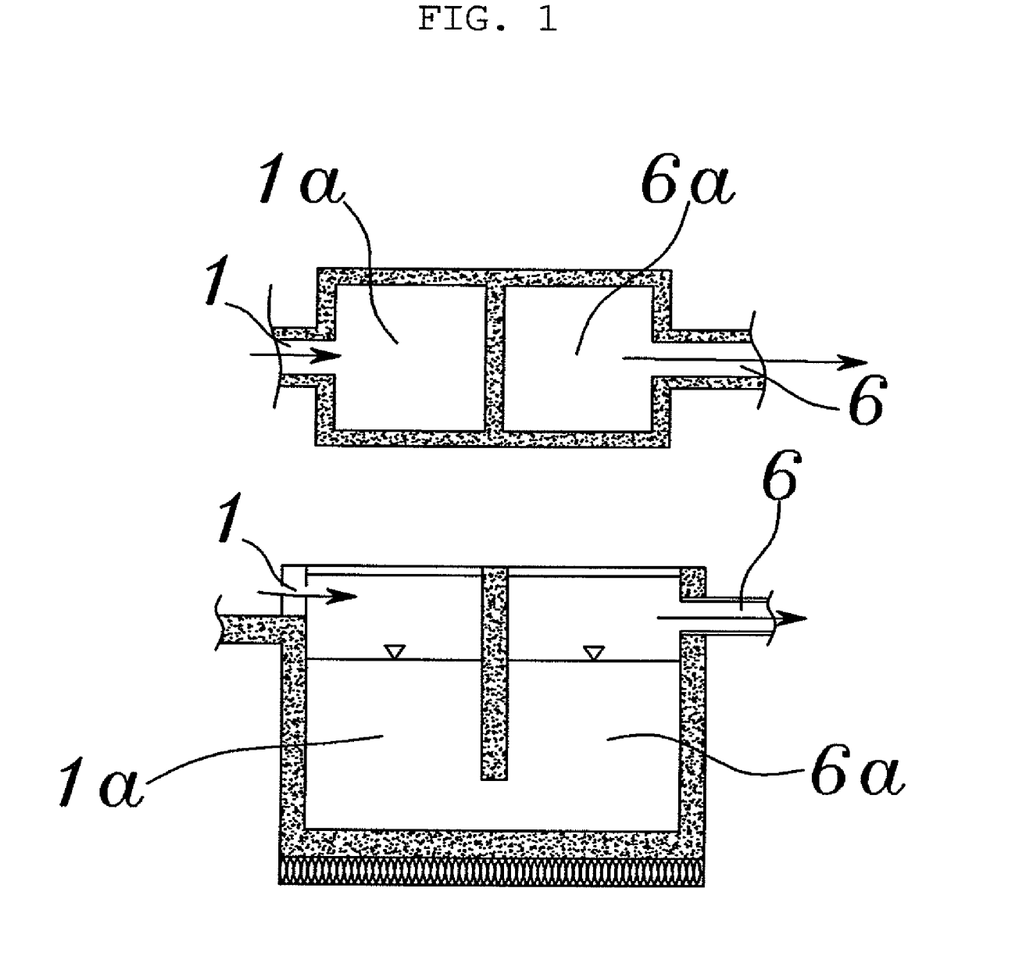
FIG. 1 is a plan view and a sectional view showing a conventional separator for separating floating and settling substances from storm-water.

As shown in FIG. 1, a conventional separator for separating floating and settling substances from storm-water has the following structure. A partition wall is provided in a rectangular parallelepiped body such that two sections, which are partitioned by the partition wall, communicate with each other under the partition wall. Of the two sections, one section is a separation chamber 1a, to which an inlet pipe 1 is connected such that storm-water is drawn through the inlet pipe 1, and the other section is a settlement chamber 6a, to which an outlet pipe 6 is connected such that the storm-water is discharged through the outlet pipe 6. Oil and floating substances are separated from storm-water in the separation chamber 1a, and settling substances are separated from storm-water at a lower position in the settlement chamber 6a. FIG. 1 is a plan view and a sectional view showing the conventional separator for separating floating and settling substances from storm-water.

This separator is characterized in that the size thereof can be changed depending on the flow rate of storm-water to be taken in and to increase the efficiency of removal of foreign substances. However, this separator has disadvantages in that an excessively large space for installation is required, and it is difficult to remove settled matter, which is disposed at the lower position, from the separator.

Figure 2:
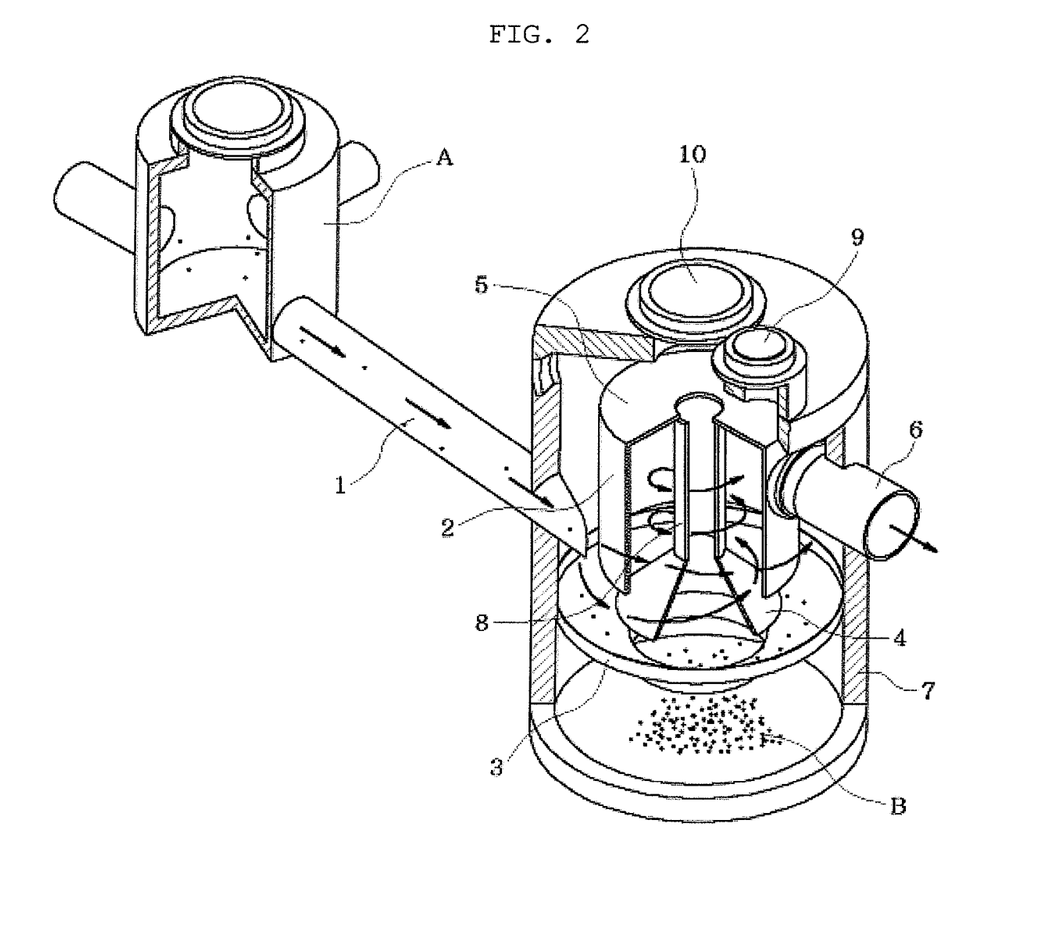
FIG. 2 is a partially broken perspective view showing a conventional vortex separator for separating floating and settling substances from storm-water.
Figure 3:
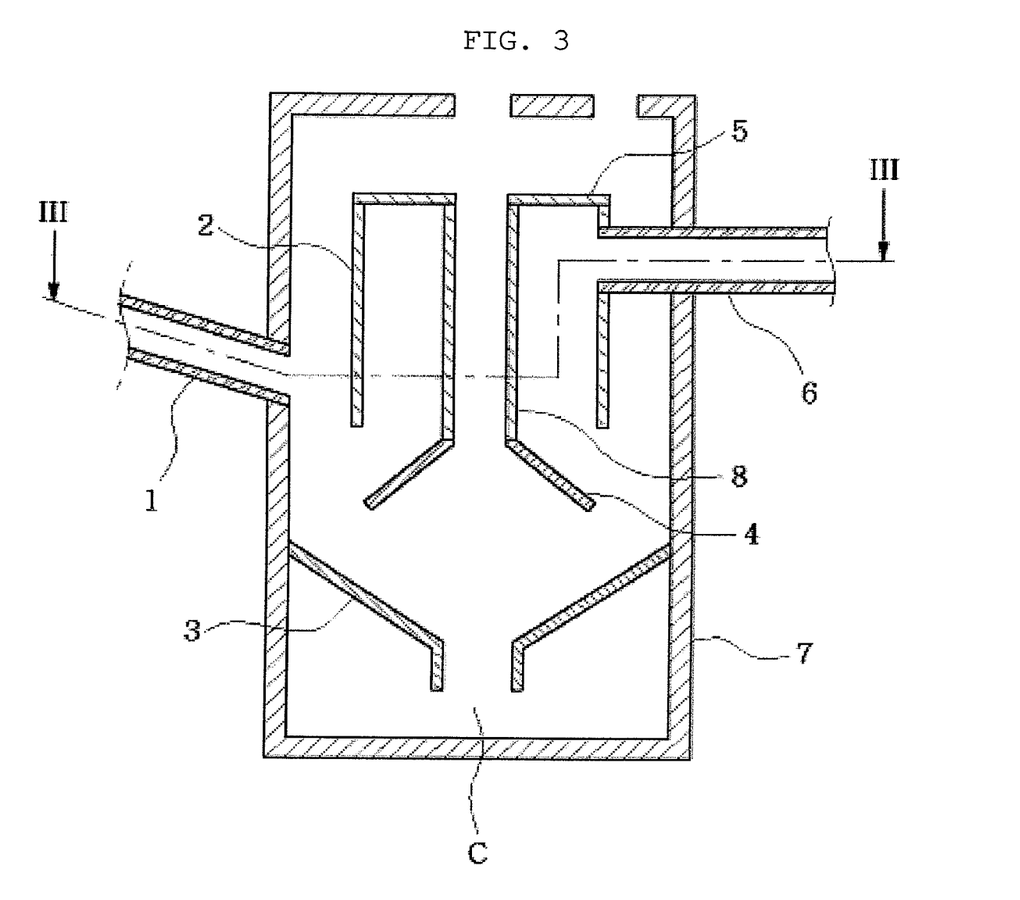
FIG. 3 is a longitudinal sectional view of the conventional vortex separator of FIG. 2.
Figure 4:
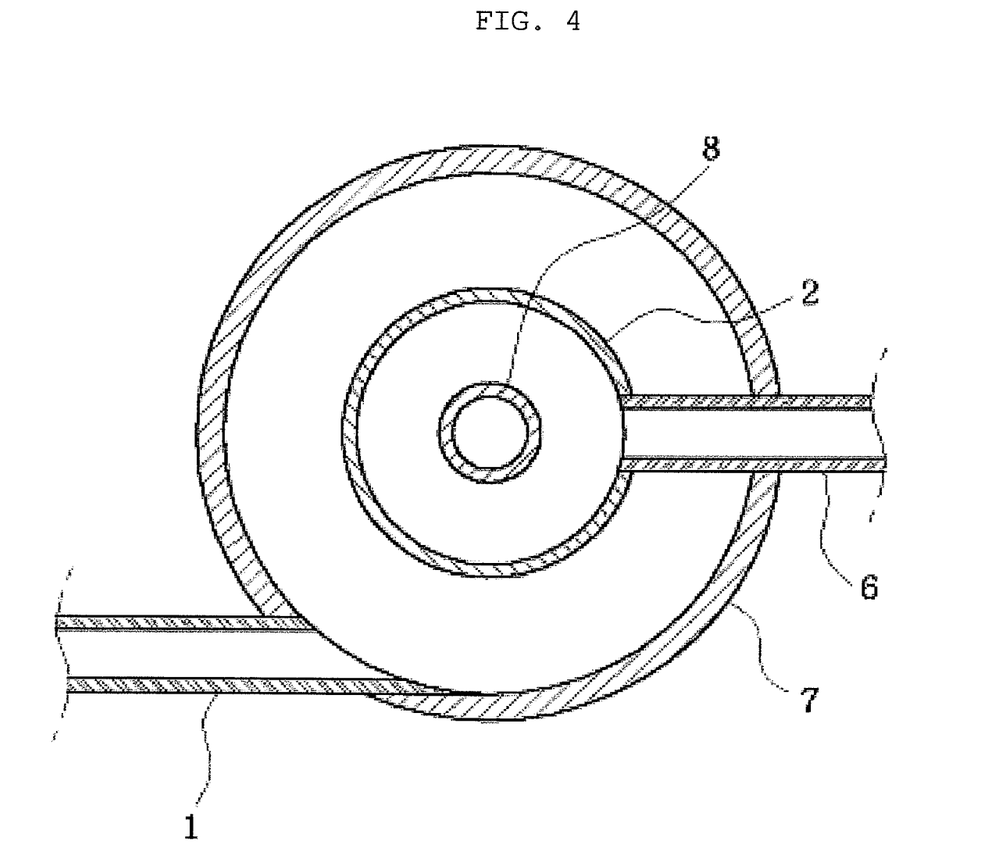
FIG. 4 is a lateral sectional view taken along the line III-III of FIG. 3.

To solve these problems, a vortex separator for separating floating and settling substances from storm-water was developed. As shown in FIGS. 2 through 4, the conventional vortex separator includes a separation casing 7 and an inlet pipe 1, which is connected to the separation casing 7 so that storm-water is drawn into the separation casing 7 through the inlet pipe 1. The vortex separator further includes a dip plate 2, which is provided in the separation casing 7 at a position spaced apart from the inner surface of the separation casing 7 by a predetermined distance, and a benching skirt 3, which is provided above a sediment storage chamber (C), so that settling substances (B) are guided onto the bottom of the sediment storage chamber (C) by the benching skirt 3.

Furthermore, a center cone 4 is provided above the benching skirt 3 and is coupled to a hollow center shaft 8, which is placed in the dip plate 2. A floating substance cover 5 is provided between the dip plate 2 and the center shaft 8 to cover a ring-shaped space defined between the dip plate 2 and the center shaft 8. An outlet pipe 6, which communicates with the ring-shaped space, is connected to the dip plate 2 at an upper position. FIG. 2 is a partially broken perspective view showing the conventional vortex separator for separating floating and settling substances from storm-water. FIG. 3 is a longitudinal sectional view of the vortex separator of FIG. 2. FIG. 4 is a lateral sectional view taken along the line III-III of FIG. 3.

The operation of the conventional vortex separator having the above-mentioned construction will be explained herein below. As shown in FIG. 2, storm-water, which has been drawn into a storm-water inflow tub (A), enters the separation casing 7 through the inlet pipe 1 in a tangential direction. The storm-water thereafter rotates around the longitudinal axis of the vortex separator in the ring-shaped space, which is defined between the dip plate 2 and the inner surface of the separation casing 7. At this time, oil and floating substances rise and float on the surface of the water and are confined in the space between the dip plate 2 and the inner surface of the separation casing 7.

The storm-water continuously rotates around the longitudinal axis of the vortex separator and gradually moves towards the lower end of the dip plate 2. At this time, settling substances are moved into the sediment storage chamber (C) through an opening, which is formed at a central position through the benching skirt 3.

Thereafter, the storm-water spirally rotates around the center cone 4 slower than the speed of the outside downward flow while passing under the dip plate 2, and spirally moves upwards in the space between the dip plate 2 and the center shaft 8. Subsequently, the storm-water is discharged outside through the outlet pipe 6, which is connected at the upper position to the dip plate 2.

As such, storm-water, which has been drawn into the separation casing 7 through the inlet pipe 1, spirally moves downwards outside the dip plate 2 and spirally moves upwards in the dip plate 2 before being discharged outside the separation casing 7 through the outlet pipe 6. Because storm-water passes through such a long path, when the storm-water reaches the outlet, a lot of floating and settling material has been removed from the storm-water.

However, the conventional vortex separator has a disadvantage in that, because it is devised mostly to separate coarse settling substances from storm-water, fine settling substances cannot be reliably separated.

In other words, after storm-water is first drawn into the ring-shaped space defined outside the dip plate, coarse settling substances, which have a relatively fast settling speed, can be moved downwards in the ring-shaped space, in which the storm-water forms a relatively long and stable stream. However, the flow of storm-water changes in direction at the lower end of the dip plate and moves upwards along the center cone into the dip plate. At this time, the storm-water secondarily rotates in the dip plate. In the dip plate, because storm-water forms a relatively short and unstable stream and thus rotates around the longitudinal axis for a relatively short time before being discharged outside through the outlet pipe, some fine settling substances, which are contained in the storm-water, may be discharged along with the storm-water outside the separation casing without being deposited.

Furthermore, the conventional vortex separator requires not only a manhole for removing the settled substances through a substance removal hole but also another manhole for removing floating substances. Therefore, installation and maintenance of the vortex separator are difficult and complicated. In particular, in the case in which the vortex separator is installed in a road, the presence of two manholes may interfere with traffic.

As well, in areas where maintenance or cleaning of roads is not reliably conducted, when foreign substances, such as large stones or reinforcing bars, enter the vortex separator when it rains, it may be impossible to remove them using typical mechanical equipment. In this case, an access must be defined to allow a person to enter the vortex separator therethrough to remove them. However, because the conventional vortex separator has a structure which does not allow access by a person, the internal parts may be disassembled. As such, there is a problem in that maintenance is very difficult.

SUMMARY OF THE INVENTION

Accordingly, the present invention has been made keeping in mind the above problems occurring in the prior art, and an object of the present invention is to provide a vortex separator for separating floating and settling substances from storm-water in which coarse settling substances, which can be easily deposited, are separated from storm-water in a center space, that is, in a guide plate, in which storm-water forms a relatively short and unstable stream, and fine settling substances are separated from storm-water in a ring-shaped space, that is, outside the guide plate, in which storm-water forms a relatively long and stable stream, and which can simultaneously remove settling substances, floating substances and oil from storm-water, and in which a separated substance removal hole is formed at a position aligned both with the space inside the guide plate and with a passing hole, so that it is possible to remove the floating and settling substances from the vortex separator using only a single separated substance removal hole, thus installation and maintenance are simplified, thereby minimizing the obstruction of traffic, and which allows a person to easily access a sediment storage chamber, so that, even if various kinds of foreign substances are drawn into the vortex separator, they can be easily removed, thus maintenance is easy.

In order to accomplish the above object, the present invention provides a vortex separator for separating floating and settling substances from centrally inflowing storm-water, including: a separation casing; a guide plate provided in the separation casing and supported by a connection plate; an inlet pipe coupled to the guide plate and extending outside the separation casing, so that the storm-water is drawn into the guide plate through the inlet pipe; a perforated inclined skirt provided below the guide plate to guide the settling substances to a bottom of a sediment storage chamber and to prevent the settling substances from being resuspended; and an outlet pipe coupled to the separation casing at a position below the connection plate and extending outside the separation casing, so that the storm-water is discharged through the outlet pipe.

The inlet pipe may be coupled to the guide plate in a tangential direction such that the storm-water, which is drawn into the guide plate, rotates around a central axis of the guide plate.

The perforated inclined skirt may be inclined downwards from a center thereof to an outside thereof so as to guide the storm-water, which is drawn into the guide plate and spirally moved downwards, to an outside of the guide plate.

The perforated inclined skirt may have a passing hole at the center thereof so that the settling substances are moved into the sediment storage chamber through the passing hole, and have at least one guide hole at a perimeter thereof so that fine settling substances are guided into the sediment storage chamber through the guide hole.

The vortex separator may further include a guide chute provided on an end of the inlet pipe in the guide plate to guide a flow of the storm-water.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, an embodiment of the present invention will be described in detail with reference to the attached drawings.

Figure 5:
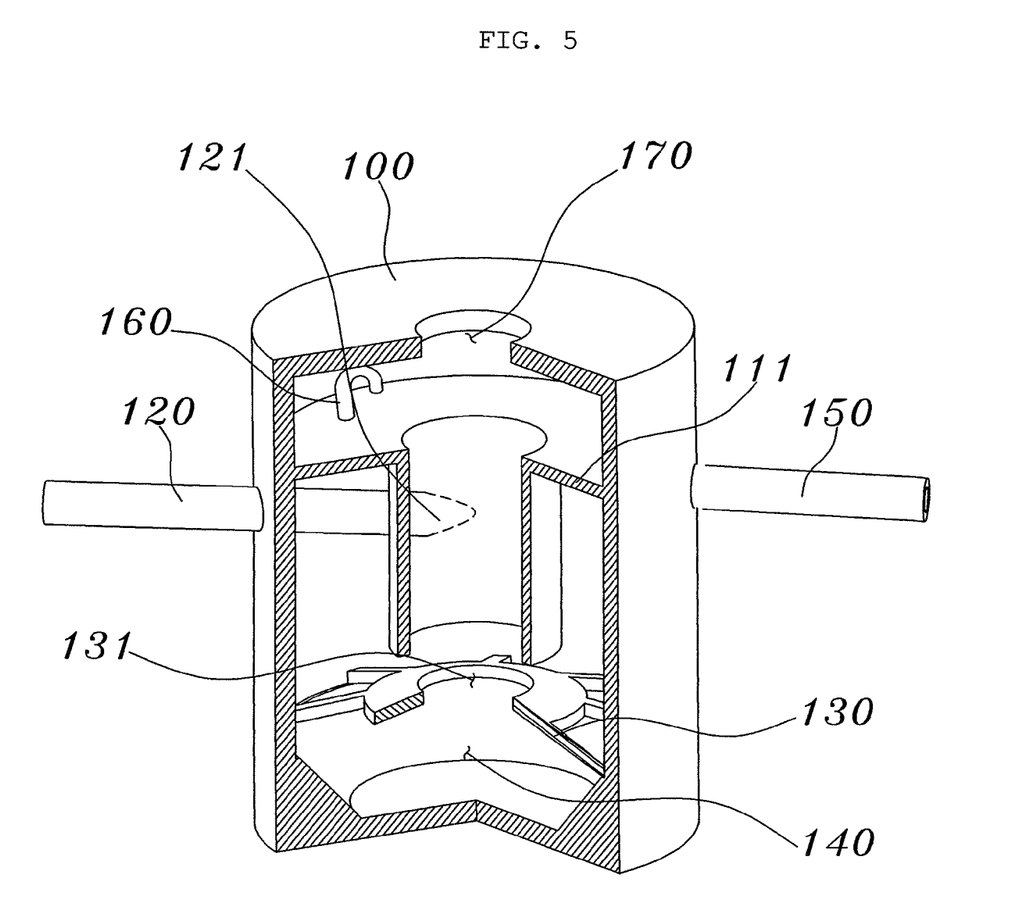
FIG. 5 is a partially broken perspective view showing a conventional vortex separator for separating floating and settling substances from storm-water, according to an embodiment of the present invention.
Figure 6:
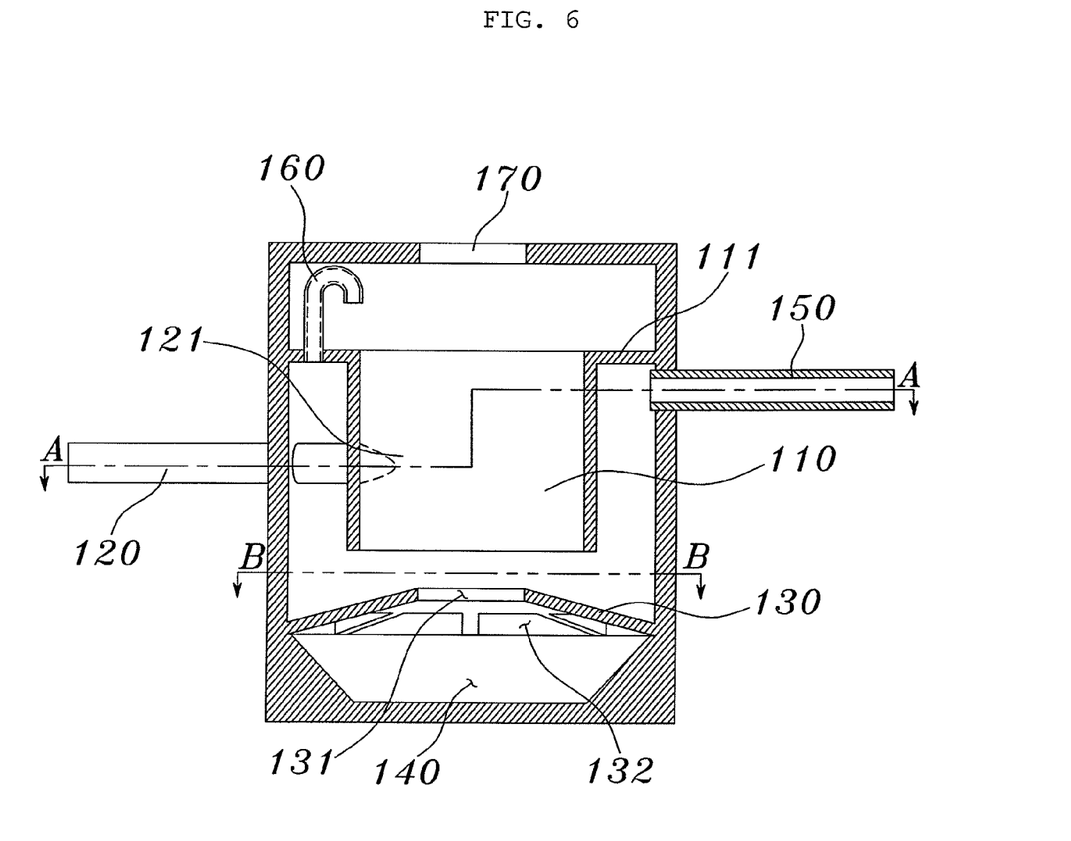
FIG. 6 is a longitudinal sectional view of the vortex separator according to the present invention.

FIG. 5 is a partially broken perspective view showing a conventional vortex separator for separating floating and settling substances from storm-water, according to the embodiment of the present invention. FIG. 6 is a longitudinal sectional view of the vortex separator of the present invention.

As shown in FIGS. 5 and 6, the vortex separator of the present invention, which is an apparatus for separating floating and settling substances from storm-water, is placed in a path along which fluid moves from a high position to a low position. Thus, the vortex separator does not require additional power, so that a separate drive unit is unnecessary.

In the vortex separator of the present invention, a guide plate 110 is provided in a separation casing 100, and an inlet pipe 120 is connected to the guide plate 110 through a sidewall of the separation casing 100, so that storm-water is drawn into the guide plate 100 through the inlet pipe 120. A perforated inclined skirt 130 is placed below the guide plate 110. An outlet pipe 150 is connected at a predetermined position to the separation casing 100, so that treated storm-water, from which floating and settling substances are separated, is discharged outside the separation casing 100 through the outlet pipe 150.

The separation casing 100 is hollow and has a structure such that storm-water is drawn thereinto and discharged after floating and settling substances are separated from the storm-water. Floating substances and oil are stored at an upper position in a space defined in the guide plate.

Figure 7:
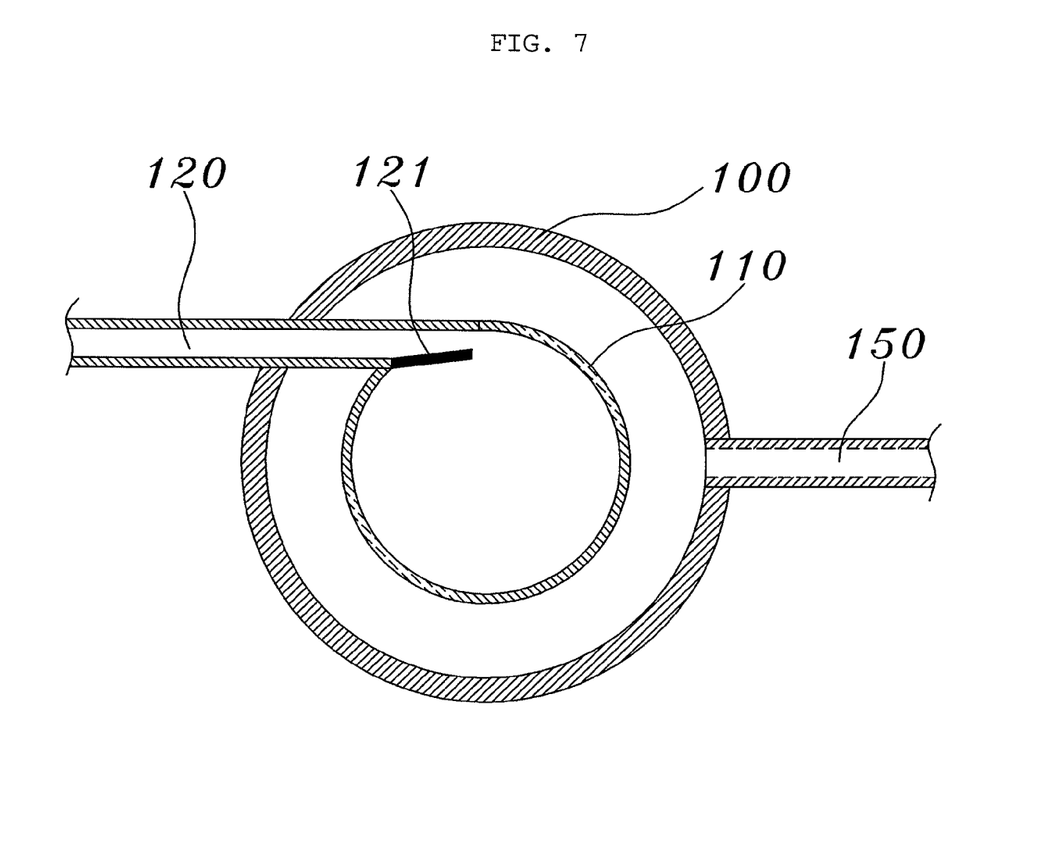
FIG. 7 is a lateral sectional view taken along the line A-A of FIG. 6.

FIG. 7 is a lateral sectional view taken along the line A-A of FIG. 6.

As shown in FIGS. 5 through 7, the guide plate 110 is supported by a connection plate 111, which is coupled to the inner surface of the separation casing 100. A ring-shaped space is defined between the connection plate 111, the separation casing 100 and the guide plate 110. The connection plate 111 serves as a part for the installation of an air duct 160, which will be described later herein, as well as serving to couple the guide plate 110 to the inner surface of the separation casing 100. Furthermore, when storm-water, which has been drawn into the guide plate 110, overflows outside the guide plate 110, the connection plate 111 serves to prevent the storm-water from entering the ring-shaped space, thus preventing untreated storm-water from being discharged outside.

The inlet pipe 120 is connected to the guide plate 110 and extends outside the separation casing 100, so that storm-water is drawn into a center space defined in the guide plate 110 through the inlet pipe 120. The inlet pipe 120 is connected to the guide plate 110 in a tangential direction such that storm-water, which is drawn into the guide plate 110, creates a vortex while moving downwards.

Figure 8:
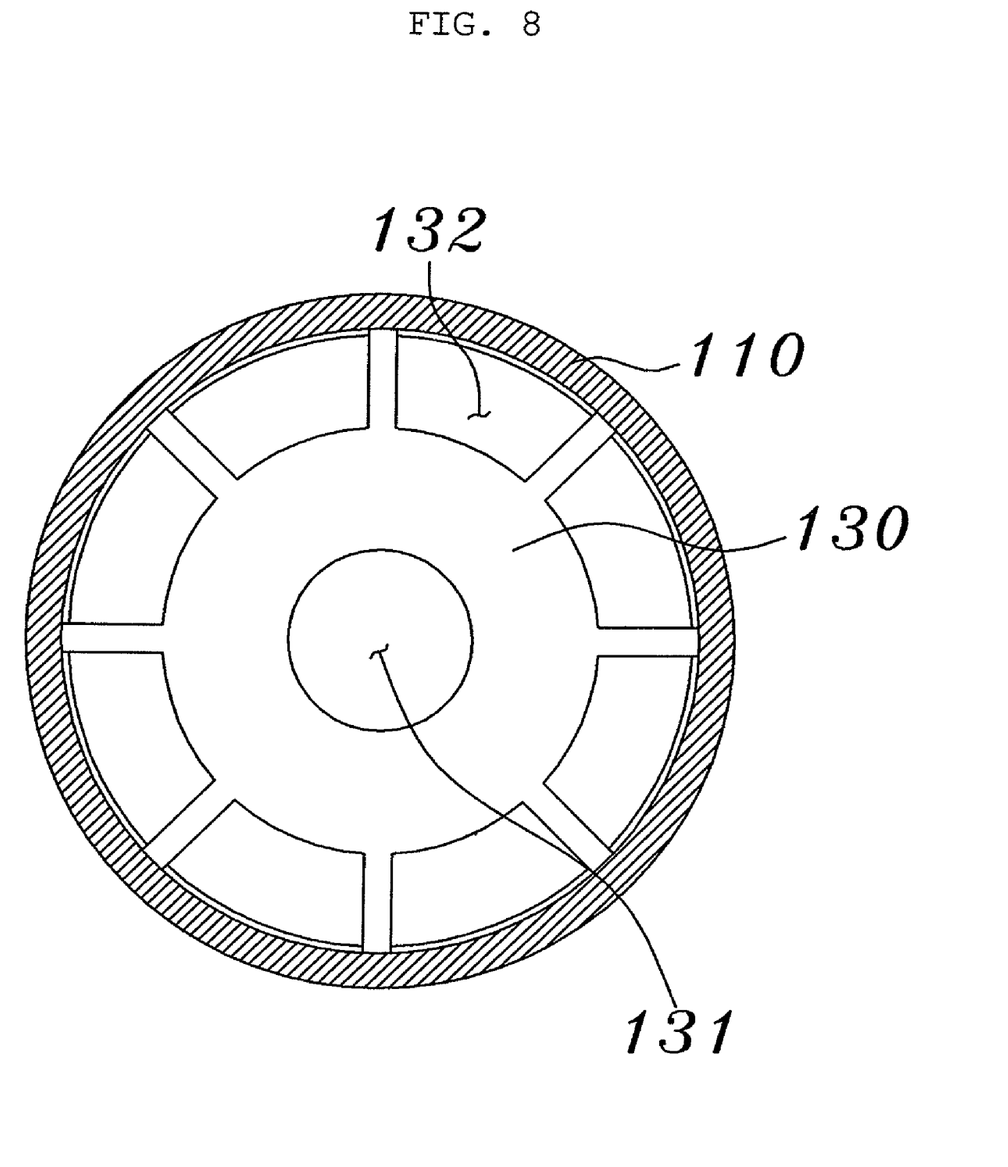
FIG. 8 is a lateral sectional view taken along the line B-B of FIG. 6.

FIG. 8 is a lateral sectional view taken along the line B-B of FIG. 6.

Coarse settling substances, which are relatively large particles and are taken in along with storm-water, are guided onto the bottom of a sediment storage chamber 140 through passing holes 131 of the perforated inclined skirt 130, which is placed below the guide plate 110. As shown in FIGS. 5 and 6, the sediment storage chamber 140 is provided below the perforated inclined skirt 130 at a lower position in the separation casing 100.

Furthermore, the perforated inclined skirt 130 is inclined downwards from the center thereof towards the outside, so that, when storm-water, which has been drawn into the guide plate 110, is guided outside the guide plate 110, an upward vortex is created by the water. Coarse settling substances are moved into the sediment storage chamber 140 through the passing hole 131, which is formed at the central position through the perforated inclined skirt 130, and fine settling substances, which are deposited in the ring-shaped space, are moved into the sediment storage chamber 140 through guide holes 132, which are formed through the perimeter of the perforated inclined skirt 130.

As shown in FIG. 7, the outlet pipe 150 is coupled to the separation casing 100 just below the connection plate 111, and extends a predetermined length outwards, so that storm-water is discharged outside through the outlet pipe 150. Here, the term "storm-water", used above, means treated and clear storm-water, which is moved into the ring-shaped space outside the guide plate 110 after settling and floating substances have been separated therefrom.

Meanwhile, the air duct 160 is provided at a predetermined position on the connection plate 111, so that air is discharged from the ring-shaped space, which is defined outside the guide plate 110, through the air duct 160. A guide chute 121 is coupled to the inlet pipe 120 in the guide plate 110 to guide the flow of storm-water.

Furthermore, a separated substance removal hole 170 is formed through the upper surface of the separation casing 100 above the guide plate 110. Accordingly, a worker can periodically remove settling substances, which are stored in the sediment storage chamber 140, and floating substances through the separated substance removal hole 170 after making observations to determine whether it is required. As such, the vortex separator of the present invention does not have a separate consumable element, such as a filter, which requires replacement. Furthermore, the separated substance removal hole 170 for removal of floating and settling substances is coaxially aligned both with the center space defined in the guide plate, in which the floating substances are separated from the storm-water, and with the passing holes 131 of the perforated inclined skirt 130, through which settling substances are moved into the sediment storage chamber 140, thus forming a linear passage shape. As such, the present invention requires only one separated substance removal hole. Therefore, the present invention has advantages of simple installation and maintenance. As well, the present invention is advantageous in that the worker can easily access the sediment storage chamber 140 for maintenance thereof without removing or disassembling internal elements from the vortex separator.

The operation of the vortex separator of the present invention having the above-mentioned construction will be described in detail herein below.

Figure 9:
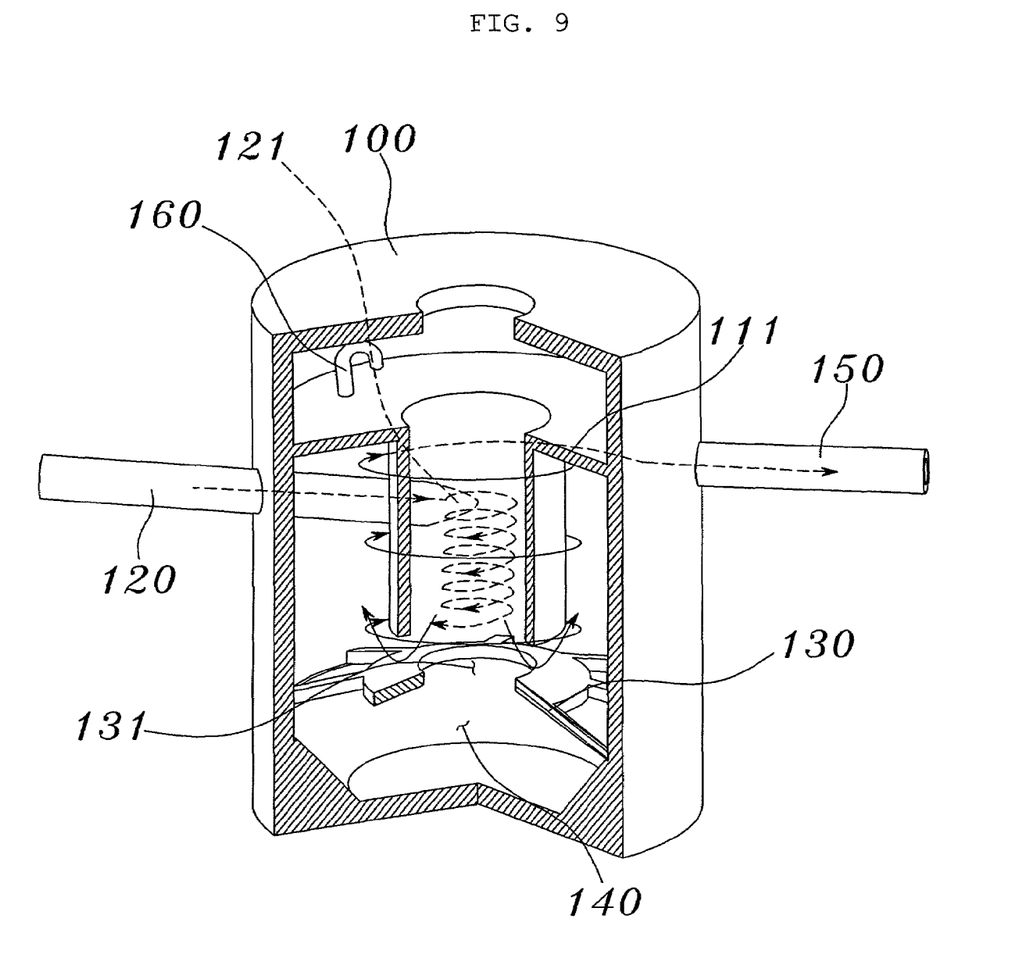
FIG. 9 is a partially broken perspective view showing the flow of storm-water in the vortex separator according to the present invention.

FIG. 9 is a partially broken perspective view showing the flow of storm-water in the vortex separator according to the present invention.

As shown in FIG. 9, storm-water is drawn into the guide plate 110 from the outside of the separation casing 100 through the inlet pipe 120 in the tangential direction of the guide plate 110. The drawn storm-water is spirally moved downwards in the guide plate 110. During the spiral movement of the storm-water, oil and floating substances, having specific gravities less than that of water, float on the water, and settling substances, having specific gravities greater than that of water, move downwards towards the sediment storage chamber 140 through the passing hole 131 of the perforated inclined skirt 130.

Thereafter, the flow of the storm-water, which has spirally moved downwards, changes at the lower end of the guide plate 110. That is, the storm-water spirally moves upwards outside the guide plate 110 and creates a vortex. Furthermore, the storm-water, which has spirally moved downwards in the guide plate 110, has a tendency to move outwards on the perforated inclined skirt 130 due to centrifugal force, and storm-water, which is guided outwards by the incline of the perforated inclined skirt 130, spirally moves upwards outside the guide plate 110.

In other words, storm-water creates a vortex and undergoes upward spiral movement in the ring-shaped space defined outside the guide plate 110 in the separated casing 100. During this process, fine settling substances slowly move downwards and enter the sediment storage chamber 140 through the guide holes 132. Here, the fine settling substances are settling substances, which have been swept by and moved along with storm-water that has formed a short and unstable stream in the guide plate 110, without being separated from the storm-water during the downward spiral movement of the storm-water.

Because the turning radius of storm-water in the guide plate 110 is less than that outside the guide plate 110, the speed of the vortex created when storm-water is drawn into the guide plate 110 is relatively fast.

Furthermore, the stream of storm-water is relatively short in the guide plate 110, in which the storm-water moves downwards in a tangential direction. On the other hand, the stream of storm-water is relatively long outside the guide plate 110, because the turning radius of storm-water, which spirally moves upwards, is relatively large between the guide plate 110 and the inner surface of the separation casing 100. As well, outside the guide plate 110, the speed of moving storm-water is reduced by resistance of the sidewalls.

Therefore, fine settling substances are moved along with storm-water, which moves at a high speed, in the guide plate 110. Thereafter, the storm-water moves outside the guide plate 110 and spirally moves upwards. At this time, the speed of the vortex of storm-water becomes slower than that in the guide plate 110. Thus, fine settling substances are moved by gravity, while storm-water spirally moves upwards.

As such, the speed of the vortex in the guide plate 110 is greater than that outside the guide plate 110, but because coarse settling substances having sufficiently high specific gravities are deposited faster than fine settling substances, they can also be deposited at the guide plate 110.

In conclusion, at an initial stage in which storm-water, which is drawn into the guide plate 110 through the inlet pipe 120, is spirally moved downwards in the guide plate 110, coarse settling substances, floating substances and oil are separated from the storm-water, and while the storm-water slowly moves upwards outside the guide plate 110 after the moving direction changes, fine settling substances are separated from the storm-water.

As such, oil and floating substances, which have been taken along with storm-water into the guide plate 110, are separated by floating on the storm-water. Furthermore, coarse settling substances are moved into the sediment storage chamber 140 through the passing hole 131 of the perforated inclined skirt 130 and are stored therein, and fine settling substances are moved into the sediment storage chamber 140 through the guide holes 132 of the perforated inclined skirt 130 and are stored therein. The treated storm-water, from which floating and settling substances have been removed, is spirally moved upwards outside the guide plate 110 and is discharged outside the separation casing 100 through the outlet pipe 150.

Meanwhile, while storm-water flows in the ring-shaped space outside the guide plate 110, air, which has existed in the ring-shaped space, rises and is discharged to the upper portion of the separation casing 100 through the air duct 160, thus the storm-water can flow more smoothly. The floating substances, which float on the water in the center space in the guide plate 110, and the settling substances, which are stored in the sediment storage chamber 140, can be periodically observed and removed through the separated substance removal hole 170.

The vortex separator of the present invention having the above-mentioned construction and operation can be provided on a branch type storm-water pipe to treat storm-water at an initial stage when it rains and can be used in new development zones and new development housing areas. Furthermore, the present invention can be used in a pretreatment process for storm-water around a road, a parking lot, a maintenance shop, a plant, or a lake.

As described above, in a vortex separator for separating floating and settling substances from storm-water according to the present invention, an inlet pipe is connected to a guide plate provided in a separator casing, and an outlet pipe is connected to the separator casing. Thus, coarse settling substances, floating substances and oil are separated from storm-water in the center space in the guide plate, in which the turning radius of storm-water is relatively small. Fine settling substances are separated from the storm-water in a ring-shaped space, which is defined outside the guide plate, and in which the turning radius of storm-water is relatively large. Therefore, when it rains, at an initial stage at which the level of pollutants is relatively high, the present invention can separate fine settling substances as well as coarse settling substances and floating substances from storm-water.

Furthermore, a perforated inclined skirt, which is inclined from the center thereof to the outer edge thereof, is provided below the guide plate. A passing hole and guide holes are respectively formed through the center and the perimeter of the perforated inclined skirt. Thus, the perforated inclined skirt guides movement of coarse settling substances into a sediment storage chamber through the passing hole while storm-water moves in the guide plate. In addition, the perforated inclined skirt guides movement of fine settling substances into the sediment storage chamber through the guide holes, while the storm-water flows from the inside of the guide plate to the outside of the guide plate both using centrifugal force and using the inclination of the perforated inclined skirt. As well, in the present invention, the position at which floating substances float on the water, and the passing hole, through which settling substances are moved into and stored in the sediment chamber, are aligned with each other along the same line. Therefore, conveniently, floating substances and oil, which are disposed at an upper position in the guide plate, are first removed, and settling substances, which are stored in the sediment storage chamber, are then removed. As well, when the vortex separator is installed, or when maintenance thereto is required, the present invention allows a worker to easily access the inside of the separation casing and the sediment storage chamber. Accordingly, the installation and maintenance of the vortex separator can be easily conducted.

Moreover, the present invention does not require power, thus there is no drive unit. As well, because the present invention does not have any consumable element such as a filter medium, maintenance thereto is very easy. In addition, the vortex separator of the present invention has a wide sphere of treatment and can conduct mass treatment. Furthermore, head loss is markedly reduced, and there is no re-entrainment of substances. As well, the vortex separator of the present invention has advantages in that obstruction of traffic is minimized, and the processes of designing and implementing it are easy.

Although the preferred embodiment of the present invention has been disclosed for illustrative purposes, the present invention is not limited to the construction and operation of the preferred embodiment. Furthermore, those skilled in the art will appreciate that various modifications, additions and substitutions are possible, without departing from the scope and spirit of the invention as disclosed in the accompanying claims. Therefore, such modifications, additions and substitutions must be regarded as falling within the scope of the present invention.

What is claimed is:

1. A vortex separator for separating floating and settling substances from inflowing storm-water, comprising:
   a separation casing;
   a guide plate provided in the separation casing and supported by a connection plate coupled to the inner surface of the separation casing for preventing untreated storm-water from being prematurely discharged from the separation casing;
   an inlet pipe coupled to the guide plate at a position below the connection plate and extending outside the separation casing, so that the storm-water is drawn into the guide plate through the inlet pipe;

a perforated inclined skirt provided below the guide plate to guide the settling substances to a bottom of a sediment storage chamber and to prevent the settling substances from being resuspended; and an outlet pipe coupled to the separation casing at a position below the connection plate and extending outside the separation casing, so that storm-water is discharged through the outlet pipe.

2. The vortex separator as set forth in claim 1, wherein the inlet pipe is coupled to the guide plate in a tangential direction such that the storm-water, which is drawn into the guide plate, rotates around a central axis of the guide plate.

3. The vortex separator as set forth in claim 1, wherein the perforated inclined skirt is inclined downwards from a center thereof to an outside thereof so as to guide the storm-water, which is drawn into the guide plate and spirally moved downwards, to an outside of the guide plate.

4. The vortex separator as set forth in claim 3, wherein the perforated inclined skirt has a passing hole at the center thereof so that the settling substances are moved into the sediment storage chamber through the passing hole, and has at least one guide hole at a perimeter thereof so that fine settling substances are guided into the sediment storage chamber through the guide hole.

5. The vortex separator as set forth in claim 1, further comprising:

a guide chute provided on an end of the inlet pipe in the guide plate to guide a flow of the storm-water.

6. A vortex separator comprising:

a separation casing for receiving untreated storm-water and discharging treated storm-water;

a connection plate coupled to the inner surface of the separation casing for preventing the untreated storm-water from being prematurely discharged from the separation casing;

a guide plate coupled to the connection plate in the separation casing;

an air duct coupled to the connection plate for discharging air from a space within the separation casing outside of the guide plate; and a skirt provided below the guide plate, the skirt having an inclined, disc-shaped body with a hole at a central portion thereof and a plurality of downwardly inclined openings at an outer periphery thereof for permitting settling substances from the storm-water to pass therethrough into a storage chamber at a bottommost portion of the separation casing.

7. A vortex separator comprising:

a separator casing receiving untreated storm-water and discharging treated storm-water;

a connection plate coupled to the inner surface of the separation casing for preventing untreated storm-water from being prematurely discharged;

a guide plate coupled to the connection plate in an annular chamber of the separator casing;

a skirt coupled to the inner surface of the separation casing spatially below the guide plate defining a storage chamber in the separator casing, wherein the skirt has a skirt body having a hole at a center portion thereof for permitting course settling substances from the storm-water to pass through the skirt into the storage chamber and a plurality of downwardly inclined openings at an outer periphery thereof for permitting fine settling substances to pass through the skirt into the storage chamber.

* * * * *